Patented Mar. 9, 1954

2,671,772

UNITED STATES PATENT OFFICE 2,671,772

ALPHA-AMINO ACID COPOLYMERS

Robert Neal MacDonald, New Castle, Del., and Richard Seyfarth Schreiber, Kalamazoo, Mich., assignors to E. I. du Pont de Nemours & Company, Wilmington, Del., a corporation of Delaware No Drawing. Application August 12, 1949, Serial No. 110,024

7 Claims. (Cl. 260—78)

This invention relates to new condensation polymers. More specifically it relates to new alpha-amino acid polymers.

It has been reported by Woodward and Schramm, J. Am. Chem. Soc., 69, 1550 (1947) that a high molecular weight, film-forming polymer can be prepared by the copolymerization in equal amounts of the N-carboanhydrides of L-leucine and DL-phenylalanine. Further as pointed out in the copending application of MacDonald, Serial No. 778,458, filed August 5, 1947, alpha-amino acid copolyamides of unique solubility properties can be prepared by copolymerizing the N-carboanhydrides of alpha-primary-aminocarboxylic acids containing at least one hydrogen on the alpha-carbon. However, these alpha-amino acid polyamides generally exhibit poor water sensitivity and are highly resistant to acid, direct, and vat dyes, and can be only moderately dyed by acetate dyes. This lack of water sensitivity and receptivity for the commonly used, more desirable dyes detracts from the utility of these polyamides in the fiber field.

Other alpha-amino acid polyamides of unique thermal stability which make them of interest in the preparation of films, fibers and plastics are disclosed in the copending application of Brubaker and MacDonald, Serial No. 64,042, filed December 7, 1948, now Patent Number 2,644,808. In the copolyamides of the Brubaker and MacDonald application, all of the units whether primary or secondary amino acid units, carry two primary alkyl radicals on the alpha-carbon, i. e., are devoid of hydrogen on the carbon adjacent the carbonyl carbon. These polyamides although exhibiting somewhat improved dyeability in the selected instances wherein secondary-alpha-amino acid units are found in the polyamide chain, are formed with difficulty, especially in the ultra-high molecular weights found to be necessary for optimum film and fiber performance.

Finally, although alpha-amino acid polyamides in general which contain a large preponderance of secondary alpha-amino acid units are more readily dyed, it is likewise difficult to carry the polymerization to high molecular weight, tough products and the products obtained are generally too water-sensitive for effective use in fiber formation, being in some instances water soluble.

This invention has as an object the preparation of dye receptive polyamides of enhanced water sensitivity and resiliency and good film, and fiber properties. Other objects will appear hereinafter.

These objects are accomplished by the invention of copolyamides having, in the polymer chain, only alpha hydrogen-bearing units and from 0.5 to 80.0 alpha-primary amino acid units for every alpha-secondary amino acid unit and having a major proportion of amino acid units wherein a branched chain alkyl substituent is attached to the peptide,

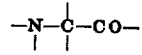

linkage. Of these copolyamides those containing from 0.75 to 15.0, and especially from 1.0 to 10.0 alpha-primary amino acid units for every alpha-secondary amino acid unit are preferred because of a better overall balance of fiber and film properties. Further, the copolyamides of this invention possess a C:N atom ratio of from 4.0:1 to 8.0:1 and contain in the polymer chain at least one alpha-amino acid unit containing attached to the polypeptide link,

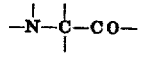

only monovalent organic radicals, preferably solely saturated hydrocarbon in nature, of up to six carbon atoms for every four, and preferably for each, alpha-amino acid units containing attached to the polypeptide link one to three monovalent, organic radicals, preferably solely saturated hydrocarbon in nature, of more than six carbons. By "saturated hydrocarbon" is meant hydrocarbon free from non-aromatic unsaturation.

Copolyamides containing in the polymer chain less than 0.75, and especially less than 0.5, alpha-primary amino acid unit for every alpha-secondary amino acid unit are generally too weak and water sensitive to be of use in forming acceptable films and fibers, being in some instances water soluble. Conversely, copolyamides containing more than 15, and especially more than 80, alpha-primary amino acid units for every alpha-secondary amino acid unit are too unresponsive to aqueous processing treatments and of too low dye receptivity to be of outstanding utility in the formation of commercially important films and fibers. Copolyamides containing from one to ten alpha-primary amino acid units for every alpha-secondary amino acid unit are especially preferred since they possess the best overall balance of dye receptivity, water-sensitivity, and tenacity. Copolyamides having an overall C:N atom ratio less than 4.0:1, regardless of the ratio between the combined alpha-primary and alpha-secondary amino acid units, are likewise too water-sensitive. Those having an overall C:N atom ratio greater than 8.0:1 do not exhibit good dye receptivity and/or response to fabric finishing treatments, regardless of the ratio between the combined alpha-primary and alpha-secondary amino acid units.

Copolyamides having in the polymer chain at least one amino acid unit devoid of monovalent radicals attached to the polypeptide link which contain more than six carbon atoms for every four, and preferably for each, amino acid units, containing attached to the polypeptide link from one to three monovalent radicals, preferably solely hydrocarbon in nature, of more than six carbons are preferred regardless of the C:N atom ratio since they exhibit better solvent resistance, higher tenacities, readier response to aqueous processing treatments and a higher degree of crystallinity—all properties much desirable for outstanding fiber performance. The copolyamides of this invention consisting solely of combined alpha-amino acid units all of which units are devoid of radicals containing more than six carbons are especially outstanding since these desirable properties are much more apparent.

Among the known amide-forming derivatives of the alpha-amino acids which may be used in making the copolyamides of this invention are the esters, the carbon dioxide adducts of the acids, and the N-carboanhydrides. Of these, the N-carboanhydrides are preferred because they can be readily prepared in good yields from the amino acids or their salts, e. g., by the processes disclosed in the copending applications of MacDonald Serial No. 83,299, filed March 24, 1949, and Prichard Serial No. 52,971, filed October 5, 1948 (now abandoned), and because they can be polymerized readily with evolution of carbon dioxide to the desired high molecular weight copolyamides.

The following examples in which the parts given are by weight unless otherwise indicated are presented to further illustrate and not to limit this invention. The term "$\eta_{inh}$." as used in these examples refers to those results obtained with the copolyamides involved dissolved in m-cresol at 25° C. and is defined by the following equation:

$$\eta_{inh.} = \frac{ln \eta_{rel.}}{C}$$

wherein $ln$ is the natural, or Napierian logarithm, $$\eta_{rel.} = \frac{\eta_{solution}}{\eta_{solvent}}$$

$\eta$ being viscosity.

EXAMPLE I

A mixture of 95 parts of the N-carboanhydride of DL-leucine, $(CH_3)_2CHCH_2CH(NH_2)COOH$, and five parts of the N-carboanhydride of sarcosine dissolved in reagent grade benzene at 3% solids concentration is polymerized by heating the solution at the reflux for 13 days. At the end of this time the clear, viscous polymerization solution is poured out in a thin film onto a glass plate and the benzene allowed to evaporate at room temperature. After removal from the casting surface, there is obtained a tough, strong film of the copolyamide from a 95:5 by weight mixture of the N-carboanhydrides of DL-leucine and sarcosine exhibiting an $\eta_{inh.} = 0.19$. This copolyamide has a C:N atom ratio of 5.78:1 and contains 13.9 combined DL-leucine units for every combined sarcosine unit.

EXAMPLE II

The N-carboanhydride of N-isopropylglycine was prepared by the method of Leuchs, Ber. 39, 857 (1906) utilizing carbobenzyloxychloride (Org. Syn. 23, 13) on N-isopropylglycine which is prepared in good yields by the condensation of isopropylamine with glycolonitrile (Org. Syn. 27, 41) followed by subsequent hydrolysis of the resulting nitrile. The intermediate N-carbobenzyloxy-N-isopropylglycine is a colorless oil.

Analysis

Calculated for $C_{13}H_{17}NO_4$: Neutral equivalent 251; nitrogen, 5.58%.
Found: N. E., 260; nitrogen, 5.58%.

The final N-isopropylglycine N-carboanhydride is a colorless crystalline material melting at 60.0–60.2° C. and readily purified by sublimation at 80° C. under 1 mm. of mercury pressure.

Analysis

Calculated for $C_6H_9NO_3$: C, 50.4%; H, 6.30; N, 9.80%.
Found C, 50.42%; H, 6.43%; N, 9.52%.

A mixture of 75 parts of the N-carboanhydride of DL-leucine and 25 parts of the N-carboanhydride of N-isopropylglycine dissolved in reagent grade benzene at 7.0% solids concentration is polymerized by heating the solution in a reactor open to the atmosphere through a small capillary tube at 65° C. for 14 days. At the end of this time the polymerization solution is poured out in a thin film onto a glass plate and the benzene allowed to evaporate at room temperature. After removal from the casting surface, there is obtained a clear, smooth, dye-receptive film of the copolyamide from a 75:25 by weight mixture of the N-carboanhydrides of DL-leucine and N-isopropylglycine exhibiting an $\eta_{inh.} = 0.38$. This copolyamide has a C:N atom ratio of 5.73:1 and contains 2.73 combined DL-leucine units per combined N-isopropylglycine unit.

Film samples of the above copolyamide show a markedly increased receptivity for acid, acetate, direct, and vat dyes over those exhibited by amino acid polyamides containing only primary amino acid units. Specific examples of the dyes tested and the methods of dyeing used are given below wherein the dyeings are carried out for 60 minutes at the boil on like-sized strips of undrawn film (about 1–2 mils thick and freed from residual solvent by oven drying) in a dye bath containing approximately 35% dye and diluted to approximately 1,000:1, both figures based on the polymer.

In all instances in the dyeing procedures described below, after the dyeing period is complete the films are removed from the dye baths and thoroughly rinsed in warm (60° C.) running water. If appreciable or significant quantities of dye remain on the sample, it is then suspended in repeated changes of boiling water until no more color is leached into the water. The samples are then allowed to air dry.

*Dye A.*—A blue acid dyestuff powder of Colour Index Number (CIN) 1076 having approximately a 75% color content.

The dye bath used contains one part of a solution prepared by diluting 5.96 parts of concentrated sulfuric acid with 1,000 parts of water and 5 parts of a solution prepared by pasting 0.3 part of the dye in 5 parts of cold water, dissolving in 250 parts boiling water, adding 3 parts of sodium sulfate and diluting with 745 parts of water.

*Dye B.*—A red acid dyestuff powder of CIN 430 having approximately an 80% color content.

The dye bath used contains 1 part of a solution prepared by diluting 3.0 parts of glacial acetic acid with 1,000 parts of water and 5 parts of a solution prepared from 0.3 part of the dye, 3 parts of sodium sulfate and 1,000 parts of water in the manner described above for dye A.

*Dye C.*—The blue dyestuff obtainable according to the procedure of Example IX of U. S. Patent 2,050,704.

The dye bath used contains 5 parts of a solution prepared by thoroughly pasting 0.3 part of the dye in 3 parts of 10% olive oil soap solution, dispersing the paste in 30 parts of water at 70–75° C. and diluting the resultant suspension with 967 parts of warm water. The dispersion is well-shaken just prior to use.

*Dye D.*—The red dyestuff described in the sole example of Swiss Patent 149,405.

The dye bath used is made up exactly as described immediately above using 0.3 part of the dye instead of dye C.

*Dye E.*—A yellow direct dyestuff powder of CIN 365.

The dye bath used contains one part of a solution prepared by dissolving 45 parts of sodium chloride and 3 parts of trisodium phosphate in 1,000 parts of water and 5 parts of a solution prepared by pasting 0.3 part of the dye in 5 parts of cold water, dissolving in 250 parts of boiling water and diluting with 745 parts of water.

*Dye F.*—A red direct dyestuff powder of CIN 278 having approximately 55% color content.

The dye bath used contains one part of a solution prepared by dissolving 9 parts of sodium chloride in 1,000 parts of water and 5 parts of a solution prepared from 0.3 part of the dye and 1,000 parts of water as described above for dye E.

*Dye G.*—A green vat dyestuff paste of CIN 1101 having approximately an 11% color content.

The dye bath used contains five parts of a solution prepared by pasting 0.3 part of the dye in five parts of cold water, adding 0.37 part of sodium hydroxide, and diluting with 995 parts of water (this dispersion should be well shaken just prior to use), and a small quantity (0.05 part) of sodium formaldehydesulfoxylate. The solution is then placed in a 100° C. bath, the film sample added and dyeing carried out for 20 minutes. One part of a solution prepared by dissolving 9.35 parts of sodium sulfate in 1,000 parts of distilled water is then added and dyeing continued for one hour. The film is then removed from the bath and allowed to air oxidize for 30 minutes prior to rinsing.

*Dye H.*—A blue vat dyestuff paste obtained according to German Patent 331,283 when the chlorination is carried out until a chlorine content of about 5% is obtained.

The dyeing procedure and dye bath used here are exactly as described immediately above substituting 0.3 part of the dye for 0.3 part of dye G and 0.05 part of sodium hydrosulfite for the 0.05 part of sodium formaldehydesulfoxylate.

EXAMPLE III

A mixture of three parts of the N-carboanhydride of 2-amino-4,6,6-trimethylheptanoic acid (prepared as described in the copending application of MacDonald, Serial No. 778,459, filed October 7, 1947), and one part of the N-carboanhydride of sarcosine dissolved in reagent grade benzene at 3% solids concentration is polymerized by heating the solution in a reactor open to the atmosphere through a small capillary tube at 65° C. for seven days. At the end of this time the polymerization solution is poured out in a thin film onto a glass plate and the benzene allowed to evaporate at room temperature. After removal from the casting surface, there is obtained a tough, strong, dye-receptive film, responsive to aqueous processing treatments, of the copolyamide from a 3:1 by weight mixture of the N-carboanhydrides of 2-amino-4,6,6-trimethylheptanoic acid and sarcosine exhibiting an $\eta_{inh.} = 0.30$. This copolyamide has a C:N atom ratio of 7.34:1 and contains 1.62 combined 2-amino-4,6,6-trimethylheptanoic acid units per combined sarcosine unit. Film samples of this copolyamide exhibit marked receptivities for dyes A and B when dyed as described in Example II for these dyes.

EXAMPLE IV

A mixture of 80 parts of the N-carboanhydride of DL-leucine and 20 parts of the N-carboanhydride of sarcosine dissolved in reagent grade benzene at 3% solids concentration is polymerized by heating the solution for 21 days at the reflux during which time the polymer precipitates as a swollen gel. At the end of this time the polymer is dissolved in a 1/1 by volume mixture of chloroform/methanol, the solution poured out in a thin film onto a glass plate, and the solvent mixture allowed to evaporate at room temperature. After removal from the casting surface, there is obtained a clear, smooth, dye-receptive film, responsive to aqueous processing treatments, of the copolyamide from an 80:20 by weight mixture of the N-carboanhydrides of DL-leucine and sarcosine exhibiting an $\eta_{inh.} = 0.26$. This copolyamide has a C:N atom ratio of 5.24:1 and contains 2.93 combined DL-leucine units for every combined sarcosine unit. Film samples of this copolyamide exhibit marked receptivities for dyes A and B when dyed as described in Example II for these dyes.

EXAMPLE V

A mixture of 75 parts of the N-carboanhydride of DL-leucine and 25 parts of the N-carboanhydride of sarcosine is dissolved at a 7% solids concentration in benzene which has been freshly distilled from a previous solution polymerization of another alpha-amino acid N-carboanhydride. Solvent is then distilled out from the reactor, thus removing any residual water in the reaction zone until the solids content is raised to 10%. The polymerization mixture is then refluxed over an infrared heat lamp while bubbling purified dry nitrogen through the solution. After refluxing in this fashion for four days, insoluble gel particles of polymer have appeared in the solution. The polymerization mixture is then dissolved in a 1:1 by volume mixture of chloroform and methanol and the resulting clear viscous solution poured in a thin film onto a glass plate and the solvent mixture allowed to evaporate at room temperature. Upon removal from the casting surface, there is obtained a clear, hard, self-supporting, dye-receptive film, responsive to aqueous processing treatments, of the copolyamide from a 3:1 by weight mixture of the N-carboanhydrides of DL-leucine and sarcosine. This copolyamide exhibits an inherent viscosity of 0.56, has a C:N atom ratio of 5.05:1, and contains 2.20 combined DL-leucine units per combined sarcosine unit. Film samples of this copolyamide exhibit improved dye receptivities for dyes A, B, C, D, E, F, G, and H when dyed in exactly similar fashion to the description given previously in Example II for these respective dyes.

Other copolyamides of this invention exhibiting superior dyeability and response to aqueous processing treatments while still maintaining good physical properties are listed in the following table with pertinent data on their preparation and properties. "Copolymer composition" as used therein refers to the ratios by weight in the order given of the corresponding N-carboanhydrides. "Molar ratio" is the ratio of combined primary amino acid units to combined secondary amino acid units.

Prichard, Serial No. 52,971, filed October 5, 1948, now abandoned, which involves reacting phosgene with an alpha-amino acid, or its alkali metal, alkaline earth metal, or hydrohalide salt in the presence of an inert liquid ether—both methods requiring anhydrous conditions.

The alpha-primary amino acids having hydrogen on the alpha carbon whose amide-forming derivatives can be used in preparing the copolyamides of this invention include aliphatic alpha-primary amino acids of both straight and branched chain structures, cycloaliphatic-substituted-aliphatic-alpha-primary amino acids, aromatic-substituted-aliphatic - alpha - primary amino acids or mixtures thereof. The alpha-secondary amino acids having hydrogen on the alpha carbon, i. e., N-substituted alpha-amino acids, whose amide-forming ingredients are used in preparing the copolyamides of this invention include N-alkyl-substituted, N-aryl-substituted, N - aralkylsubstituted, aliphatic - alpha - amino acids or mixtures thereof. The copolyamides of this invention contain a major proportion, by

| Polymerization Conditions | | | | Copolymer Composition | $\eta_{inh.}$ | C:N Atom Ratio | Molar Ratio |
|---|---|---|---|---|---|---|---|
| Solvent | Per Cent Solids | Temp., °C. | Time (Days) | | | | |
| Benzene | 3 | Reflux | 15 | DL-leucine/sarcosine, 90/10 | 0.23 | 5.61:1 | 6.59 |
| Xylene | 2 | 120 | 5 | DL-leucine/N-methyl-alanine [1] (85.0/14.9) | | 5.68:1 | 4.68 |
| Benzene | 9.3 | 65 | 26 | DL-leucine/N-isopropyl-leucine[2] (46.4/53.6) | | 7.45:1 | 1.10 |
| Benzene | 3 | 65 | 28 | Isoleucine/sarcosine, 75/25 | 0.20 | 5.05:1 | 2.20 |
| Do | 1.3 | 120 | 5 | 2-Amino-4,6,6-trimethylheptanoic acid/N-methylheptanoic acid/N-methylalanine [1] (50/50) | | 6.30:1 | 0.61 |
| Do | 3 | 65 | 1 | 2-Amino-4,6,6-trimethylheptanoic acid/sarcosine (50/50) | 0.14 | 5.46:1 | 0.54 |
| Do | 3 | 65 | 1 | 2-Amino-4,6,6-trimethylheptanoic acid/sarcosine (80/20) | 0.16 | 7.8:1 | 2.16 |
| Benzine* | 2 | 60 | 8 | L-leucine/N-phenyl-glucine (75/25) | | 6.45:1 | 3.38 |
| Do | 3 | Reflux | 28 | DL-leucine/sarcosine (85/15) | 0.24 | 5.42:1 | 4.16 |
| Xylene | 2 | 120 | 10 | L-leucine/N-methyl-alanine [1] (50/50) | | 493:1 | 0.82 |
| Benzine | 3 | 65 | 7 | L-leucine/sarcosine (75/25) | 0.29 | 5.05:1 | 2.20 |

*+trace amine initiator.
[1] Prepared by the method of Leuchs, Ber., 39, 857 (1906) utilizing carbobenzyloxychloride (Org. Syn. 23, 13) and N-methylalanine as prepared by the condensation of methylamine and lactonitrile. The intermediate N-carbobenzyloxy-DL-N-methylalanine is a light yellow liquid.

*Analysis*

Calculated for $C_{12}H_{15}O_4N$: N. E. (neutral equivalent), 237.0.
Found: N. E., 236.5.
The DL-N-methylalanine N-carboanhydride as prepared therefrom is a white, crystalline solid melting at 75-77° C.

*Analysis*

Calculated for $C_4H_7O_3N$: C, 46.5%; H, 5.42%.
Found: C, 46.48%; H, 5.61%.
[2] Prepared by the method disclosed in the copending application of Prichard, Ser. No. 52,971, filed October 5, 1948, utilizing anhydrous dioxane, phosgene and N-isopropyl-DL-leucine [Bal, J. Am. Chem. Soc. 71, 2253 (June 1949)]. The N-isopropyl-DL-leucine N-carboanhydride is a white, crystalline material at 15° C. which melts to a clear, colorless liquid at 18-19° C.

*Analysis*

Calculated for $C_{10}H_{17}NO_3$: C, 60.3%; H, 8.54%; N, 7.03%.
Found: C, 60.32%; H, 8.27%; N, 7.22%.

Other methods known in the art can be used in preparing the N-carboanhydride used in making the copolyamides of this invention. Thus, in addition to the methods of Leuchs, MacDonald, and Prichard previously mentioned, the N-carboanhydrides can be prepared by the method disclosed in the copending application of Prichard, Serial No. 778,457, filed October 7, 1947, now Patent Number 2,516,145, which involves reacting an alpha-amino acid with carbon dioxide in the presence of an alkali metal alkoxide and subsequently reacting thionylchloride with the resulting dialkali metal salt of the N-carboxy-alpha-aminocarboxylic acid and finally isolating the desired N-carboanhydride. It is preferred to prepare these N-carboanhydrides by the methods disclosed in the previously mentioned copending application of MacDonald, Serial No. 83,299, filed March 24, 1949, which involves reacting phosgene at temperatures from −70 to +100° C. with an alpha-amino acid or its alkali metal, alkaline earth metal, or hydrohalide salt, in the presence or absence of a reaction medium and weight, of units with a branch chain substituent on the polymer chain.

The choice of constituents will depend on the properties desired in the end composition. For instance, to obtain high molecular weight copolyamides of outstanding strength and toughness, it is preferred to use amide-forming derivatives of alpha-primary- and alpha-secondary-amino acids which are, except for the amino and carboxyl group, solely hydrocarbon in nature; e. g. alpha-aminoisocaproic acid, and especially the amide-forming derivatives of such alpha-primary- and alpha-secondary-amino-hydrocarbon carboxylic acids which are optically active, i. e., resolved (L- or D-)amino acids, e. g., L-leucine and L-alanine. To improve the organic solubility of the copolyamides of this invention, which is desirable from the viewpoint of decreasing the difficulty of handling the copolyamides prior to and in the process of forming films and fibers, it is helpful to use increased proportions of the amide-forming ingredients of relatively long-chain alpha-amino acids, e. g. 2-amino-4,6,6-trimethylheptanoic acid.

When it is necessary to confer thermoplastic properties to the copolyamides of this invention or to increase their stiffness and hardness, it is desirable to increase the proportion of aromatic substituents contained in either or both the alpha-primary and alpha-secondary amino acid amide-forming ingredients used in preparing these copolyamides, e. g. the amideforming derivatives of phenylalanine and N-phenylglycine. To obtain the resilient copolyamides of this invention, resilence being a property much sought for in fiber and yarn applications, it is necessary that the alpha-primary and alpha-secondary amino acid amide-forming ingredients used in preparing these copolyamides contain a major proportion of branched chain ingredients, i. e., that the amino acid amide-forming ingredients of the primary and N-substituted alpha-amino acids being used be those of alpha-amino acids wherein a branched chain alkyl substituent is attached to the

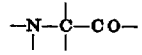

linkage, e. g. leucine, N-isopropylleucine.

It is thus possible by carefully controlling the basic carbon skeleton of the alpha-primary and alpha-secondary-amino acid amide-forming ingredients having hydrogen on alpha carbon used in preparing these copolyamides to produce an entire family of alpha-amino acid copolyamides varying in many properties and at the same time exhibiting improved resilience response to aqueous processing treatments and dye receptivity. The possibility of making such a varied group of copolyamides possessing superior properties makes the copolyamides of this invention usable in a wide range of film, fiber, paint, and plastic applications and makes this invention a considerable contribution toward solving the difficult problem of preparing synthetic materials that can be made to exhibit a multiplicity of desirable properties.

The copolymers of this invention, containing, as they do, different amino-acid units in alternation, not necessarily regular, i. e., in irregular sequence, whereby the different kinds of units separate and are separated by each other, are to be distinguished from a graft copolymer consisting of two or more polymeric parts of different compositions chemically united together. See Report on Nomenclature in the Field of Macromolecules, J. Polymer Sci., vol. 8, No. 3, March 1952, pages 257-77 and particularly pages 259, 260.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A film- and fiber-forming alpha-amino acid copolyamide consisting essentially and in irregular sequence of alpha-primary monoamino monocarboxylic acid units having hydrogen on alpha carbon and alpha-secondary monoamino monocarboxylic acid units having hydrogen on alpha carbon, having from 0.5 to 80.0 combined primary amino acid units per combined secondary amino acid unit, having a major proportion of amino acid units with a branched chain alkyl substituent on the peptide,

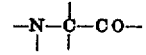

linkage, having a ratio of from four to eight carbons per nitrogen, and having at least one alpha-amino acid unit containing, attached to the peptide linkage, only monovalent organic radicals of up to six carbons for every four amino acid units containing, attached to the peptide linkage, a monovalent organic radical of more than six carbons.

2. A film- and fiber-forming alpha-amino acid copolyamide containing only carbon, hydrogen, carboxyl oxygen, and amido nitrogen and consisting essentially and in irregular sequence of alpha-primary monoamino monocarboxylic acid units having hydrogen on alpha carbon and alpha-secondary monoamino monocarboxylic acid units having hydrogen on alpha carbon, having from 0.5 to 80.0 combined primary amino acid units per combined secondary amino acid unit, having a major proportion of amino acid units with a branched chain alkyl substituent on the peptide,

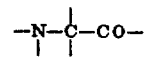

linkage, having a ratio of from four to eight carbons per nitrogen, and having at least one alpha-amino acid unit containing, attached to the peptide linkage, only monovalent saturated hydrocarbon radicals of up to six carbons for every four amino acid units containing, attached to the peptide linkage, a monovalent saturated hydrocarbon radical of more than six carbons.

3. A copolyamide according to claim 1 wherein there are from 0.75 to 15.0 alpha-primary amino acid units per alpha-secondary amino acid unit.

4. A film- and fiber-forming alpha-amino acid copolyamide containing only carbon, hydrogen, carboxyl oxygen, and amido nitrogen and consisting essentially and in irregular sequence of alpha-primary monoamino monocarboxylic acid units having hydrogen on alpha carbon, and alpha-secondary monoamino monocarboxylic acid units having hydrogen on alpha carbon, having from 1.0 to 10.0 primary amino acid units per secondary amino acid unit, having a major proportion of amino acid units with a branched chain alkyl substituent on the peptide,

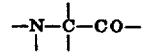

linkage, having from four to eight carbons per nitrogen, having at least one alpha-amino acid unit containing, attached to the polypeptide link, only monovalent organic radicals of not more than six carbons per alpha-amino acid unit containing, attached to the polypeptide link, a monovalent organic radical of more than six carbons.

5. A film- and fiber-forming alpha-amino acid polyamide, insoluble in water and dilute acid, containing only saturated carbon, hydrogen, carboxyl oxygen and amido nitrogen, and consisting essentially and in irregular sequence of alpha-primary monoamino monocarboxylic acid units having hydrogen on alpha carbon and alpha-secondary monoamino monocarboxylic acid units having hydrogen on alpha carbon, having from 1.0 to 10.0 primary amino acid units per secondary amino acid unit, having a major proportion of amino acid units with a branched chain alkyl substituent on the peptide,

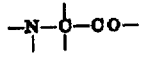

linkage, having from four to eight carbons per nitrogen, and having at least one alpha-amino acid unit containing, attached to the polypeptide

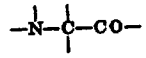

link, only monovalent organic radicals of not more than six carbons per alpha-amino acid unit containing, attached to the polypeptide link, a monovalent organic radical of more than six carbons.

6. A film- and fiber-forming alpha-amino acid copolyamide consisting essentially and in irregular sequence of alpha-primary monoamino monocarboxylic acid units having hydrogen on alpha carbon and alpha-secondary monoamino monocarboxylic acid units having hydrogen on alpha carbon, the acids of all said units having the one amino and one carboxyl group as their only reactive groups, said copolyamide having from 0.5 to 80.0 combined primary amino acid units per combined secondary amino acid unit, having a major proportion of amino acid units with a branched chain alkyl substituent on the peptide,

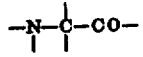

linkage, having a ratio of from four to eight carbons per nitrogen, and having at least one alpha-amino acid unit containing, attached to the peptide linkage, only monovalent saturated hydrocarbon radicals of up to six carbons for every four amino acid units containing, attached to the peptide linkage, a monovalent saturated hydrocarbon radical of more than six carbons.

7. A film- and fiber-forming alpha-amino acid copolyamide consisting essentially and in irregular sequence of alpha-primary monoamino monocarboxylic acid units having hydrogen on alpha carbon and alpha-secondary monoamino monocarboxylic acid units having hydrogen on alpha carbon, the acids of all said units having the one amino and one carboxyl group as their only reactive groups, said copolyamide having from 0.5 to 80.0 combined primary amino acid units per combined secondary amino acid unit, having a major proportion of amino acid units with a branched chain alkyl substituent on the peptide,

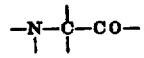

linkage, having a ratio of from four to eight carbons per nitrogen, and having the radicals attached to the peptide linkage of not more than six carbons.

ROBERT NEAL MacDONALD.
RICHARD SEYFARTH SCHREIBER.

References Cited in the file of this patent

UNITED STATES PATENTS

| Number | Name | Date |
|---|---|---|
| 2,406,186 | Baldwin et al. | Aug. 20, 1946 |
| 2,592,446 | MacDonald | Apr. 8, 1952 |
| 2,608,548 | Tullock | Aug. 26, 1952 |

FOREIGN PATENTS

| Number | Country | Date |
|---|---|---|
| 555,129 | Great Britain | Aug. 5, 1923 |

OTHER REFERENCES

Mitchell: Textbook of Biochemistry, pub. by McGraw-Hill Book Co., 1946, pages 88–91 and 97.

International Union Report on Nomenclature, Journal of Polymer Science, volume 8, 1952, pages 257, 259, 260, 275 and 276.

Certificate of Correction

Patent No. 2,671,772                                                       March 9, 1954

Robert Neal MacDonald et al.

It is hereby certified that error appears in the printed specification of the above numbered patent requiring correction as follows:

Columns 7 and 8, in the table, lines 5 and 6 thereof, under the heading "Copolymer Composition", strike out "N-methylheptanoic acid/"; under the same heading, line 11 thereof, for "glucine" read *glycine*; same table, under the heading "C: N Atom Ratio", line 13 thereof, for "493: 1" read *4.93 : 1*; under the table, line 2 of footnote "2", for "Bal," read *Gal,*;

and that the said Letters Patent should be read as corrected above, so that the same may conform to the record of the case in the Patent Office.

Signed and sealed this 4th day of May, A. D. 1954.

[SEAL]

ARTHUR W. CROCKER,
*Assistant Commissioner of Patents.*